UNITED STATES PATENT OFFICE.

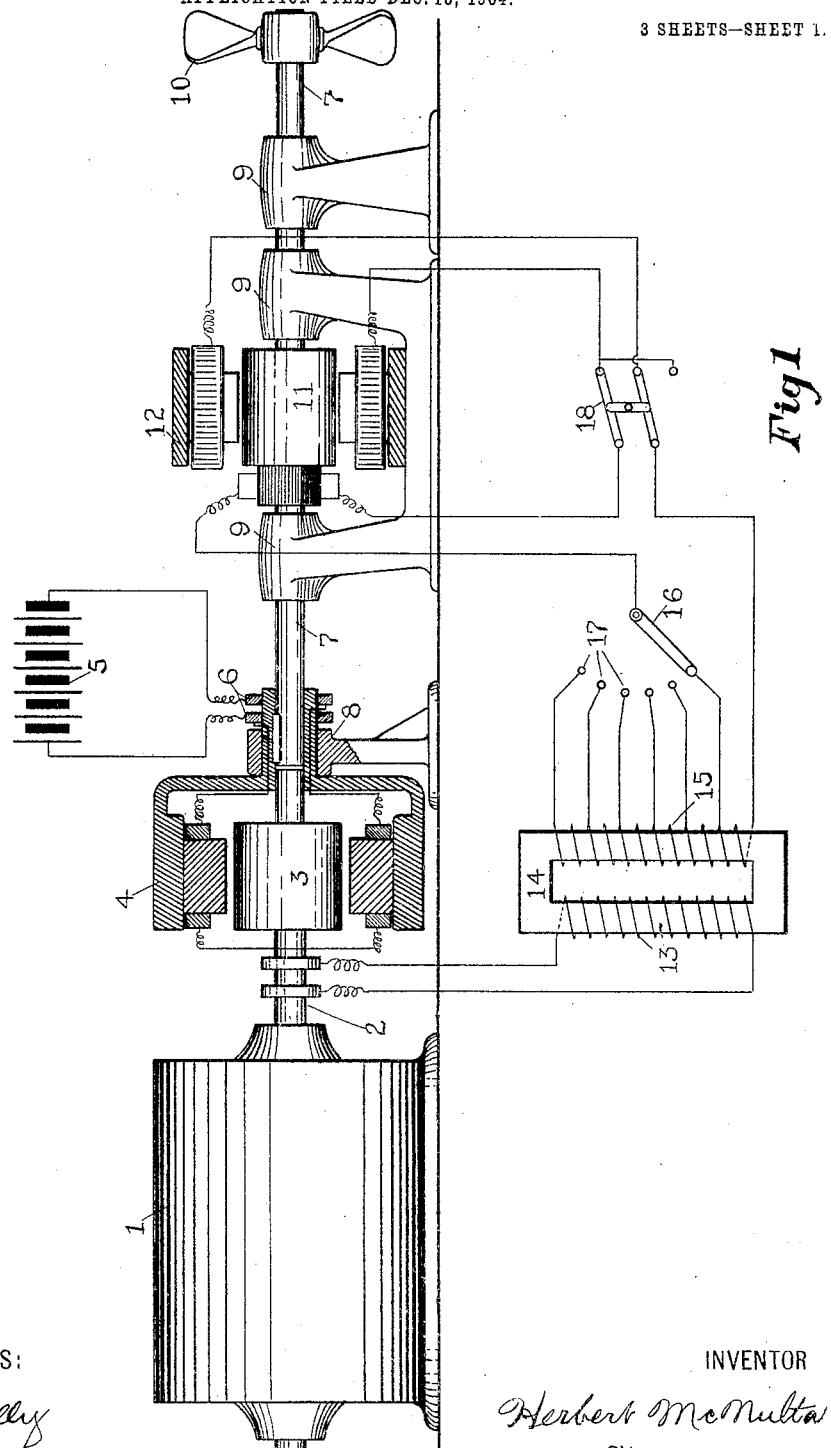

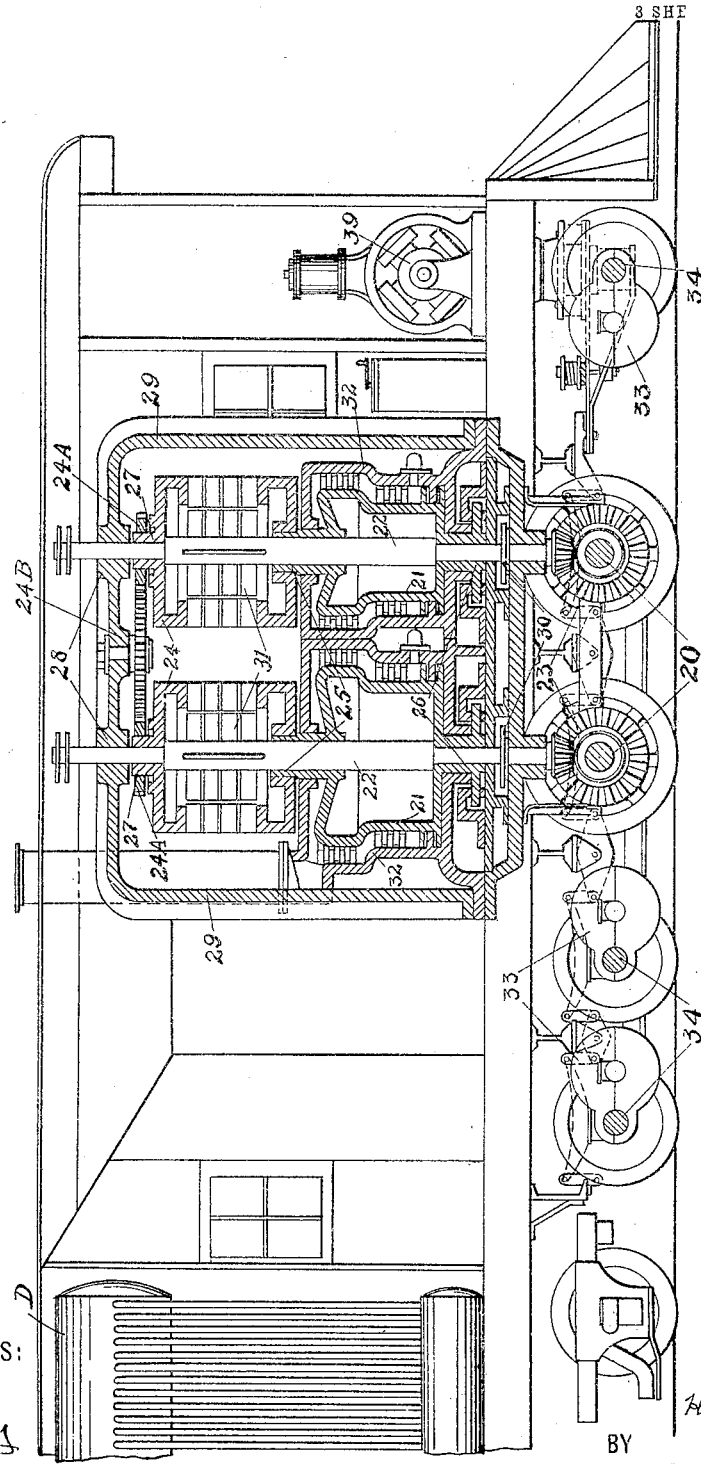

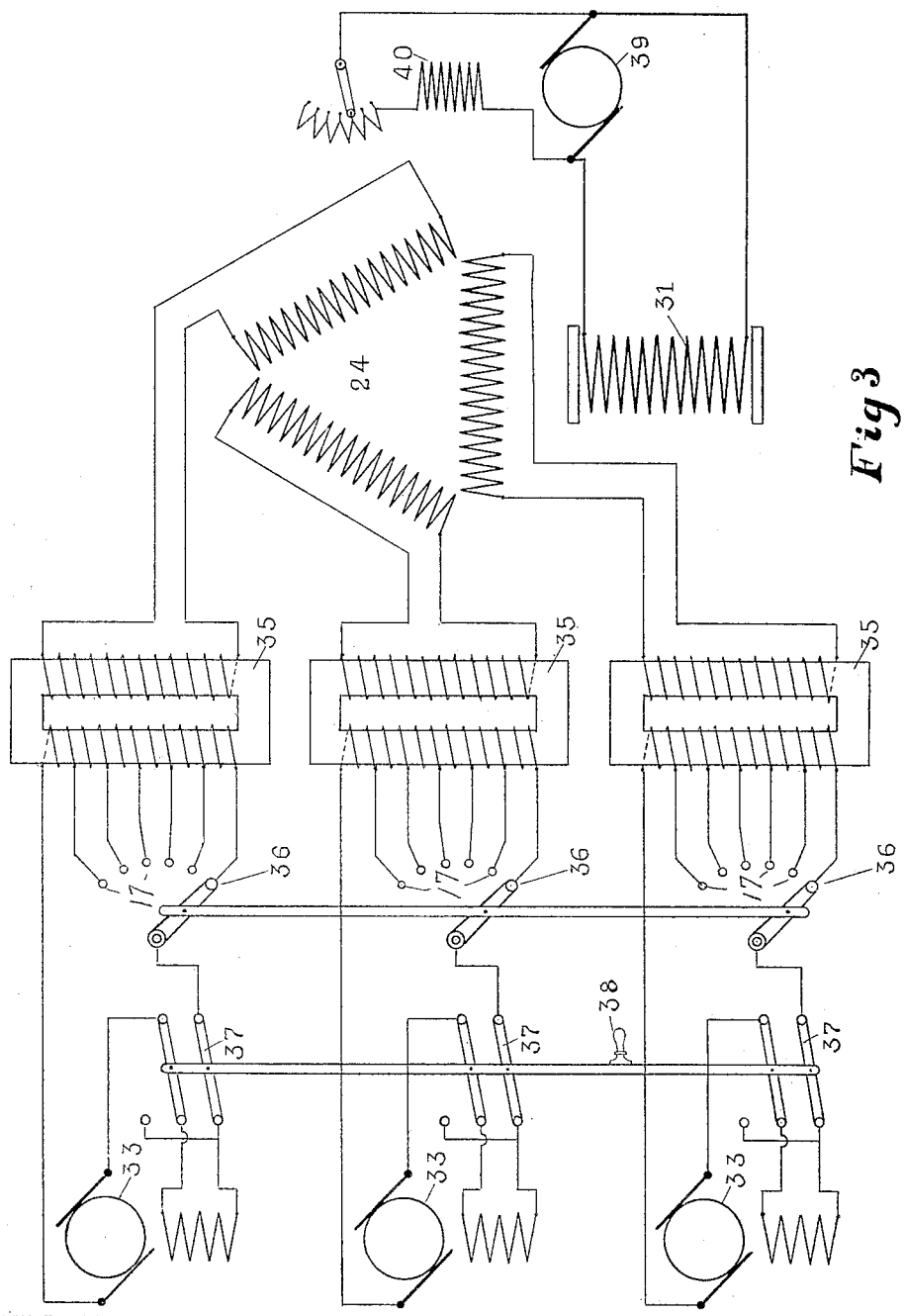

HERBERT McNULTA, OF ANACONDA, MONTANA.

ELECTRIC POWER-TRANSMISSION DEVICE.

No. 801,898.  Specification of Letters Patent.  Patented Oct. 17, 1905.

Application filed December 10, 1904. Serial No. 236,369.

*To all whom it may concern:*

Be it known that I, HERBERT MCNULTA, a citizen of the United States of America, and a resident of Anaconda, in the county of Deerlodge and State of Montana, have invented certain new and useful Improvements in Electric Power-Transmission Devices, of which the following is a specification.

My invention relates to the control of power-transmission from a prime mover of constant speed to a driven part which may be intended to carry a variable load and to run at different speeds.

As the invention is more usually applicable to ships and locomotives, it relates specifically to the control of a motor-vehicle, and accordingly the particular subject-matter herein described relates to means for electrically controlling the motions either of a water or a land vehicle.

As applied to ships the advantage lies in the fact that by my system of control a turbine of high rotary speed may operate a comparatively slow speed propeller without changing the speed of the turbine even when changing the speed of the propeller.

More particularly, the organization relates to the accomplishment of the functions alluded to above by means of an alternating-current motor and generator, the latter capable of having varying frequency and the former capable of being operated at different speeds and torques by alternating currents of varying frequency, together with a variable-ratio transformer for controlling and changing manually the electromotive force of said alternating current at the terminals of the motor, the transformer being interposed in the circuit between the generator and the motor. Without the variable ratios of transformation the invention would lose its practical value.

The objects of the invention are—when applied to locomotives, for example—operating the prime mover at fair efficiency at all speeds of the locomotive, with consequent economy in the use of fuel; dispensing with reciprocating parts; making available for tractive purposes the entire weight of the locomotive, its tender, and, if desired, the cars drawn by it; to so arrange that with a turbine running at full speed any desired portion or all of its useful power can be applied to the axles at any speed of the locomotive with fair economy at the turbine, with the consequence that the locomotive can be built to have a starting pull up to the sliding of its wheels; to provide that the boilers, turbines, and motors are independent of one another and repairs are much facilitated; to have a given locomotive available for freight, passenger, or switching service up to its boiler capacity and full tractive effort of its weight, with slight difference in fuel economy; to provide that by a change of gearing, a freight-locomotive may become available for high-speed passenger service; to be able to reverse the locomotive usually without stopping or reversing the turbine; to so arrange that the locomotive within the capacity of the electric motors mounted thereon may be run on sections of the road whether operated directly by an overhead trolley or by a third rail in those localities where escaping vapors would be objectionable, and to allow the wheels of the locomotive to be of small diameter, thus permitting larger furnaces to be supplied for the boilers over the driving-wheels, the size and shape of the boiler being capable of greater variation than in most other instances.

The general nature and principle of the invention, in brief, are set forth in the following statement; but the various scopes of novelty are attended to in the claims hereinafter annexed.

The general organization comprises a constant-speed prime mover, an armature of an alternating-current generator driven mechanically by said prime mover, a propeller or vehicle wheels mechanically connected to and operating with the field-magnet of said generator, an alternating-current motor whose armature is mechanically connected to said field-magnet, a field-magnet also for said motor and stationary with respect to the armature thereof, and an electric regulator adapted to give different ratios of current from said generator to said motor.

A particular phase of the invention as applied to locomotives consists of turbines geared to each other for distributing the weight on different axles, for reducing the pressure on each gearing, for dividing the driving force between the axles, and for reserve, so that accident to one turbine will not involve all; alternating-current generators one element of each of which is driven by each of said turbines, the other elements being connected to the car-axles by gearing, said axles driven by the torque of said generators; alternating-current motors on other car-axles driven by current from said alternating-current generators, and transformers with controllers for regulating the electromotive force of the current from said generators to said motors.

My description will now refer to the different views in the drawings by reference-numerals and other characters.

The following is a brief description from a draftsman's point of view of the individual figures of drawings in their numerical order.

Figure 1 shows both a mechanical construction, partly in section, and practically all the external electric circuits. The governor of the turbine is not visible; but the turbine is of that class that runs with approximately constant speed under variable loads. Fig. 2 is a general internal and sectional view in part and outside elevation for showing all the essentials in one figure. Fig. 3 is a diagram of the electric circuits involved in the construction shown in Fig. 2 in the phase of full speed.

I will now set forth the details in so far as they involve my invention directly or indirectly. The prime mover is represented by a turbine 1, reference being had to Fig. 1. This engine is of the constant-speed type and has a driving-shaft 2, upon which is fixed an armature 3 of an alternating-current generator whose field-magnet is 4 and whose exciter is the battery 5 for a source of direct current, connected by brushes 6 to said field-magnet. I do not show that the field-magnet 4 instead of the armature 3 may be mounted upon the shaft 2, as such substitution of one element for another is well known in the art. In general one of the elements is mechanically connected to the shaft 2 to be driven mechanically thereby at an approximately uniform rotary velocity. The field-magnet 4 is fixed to a separate shaft 7, whose bearings are at 8 and 9. The two shafts 7 and 2 are independently rotary, a break at their ends being seen within the bearing 8. 7 is the shaft to be driven, as may be inferred by observing the propeller 10, mounted thereon for driving any kind of boat or ship. Upon the shaft 7 is mounted one of the elements—namely, the armature 11—of an alternating-current motor adapted to be operated by an alternating current of varying frequency. The field-magnet 12 is stationary permanently with respect to the armature 11. A single-phase series alternating-current motor is appropriate or any other kind capable of operating with variable speed and torque at various frequencies below a fixed maximum, and probably the repulsion-motor would serve the purpose.

The armature 3 is electrically connected to the primary coil 13 of a transformer. (Shown at 14.) The alternating-current motor just mentioned is connected up with a secondary coil 15 of said transformer through a controller 16 and multiple contacts 17 for varying the number of turns of the secondary coil in circuit with said motor. At 18 is a reversing-switch for said motor, the connections of which need not be set forth, for they are the same as in other reversing-switches.

The *modus operandi* is as follows: When the steam is turned on, the turbine 1 is driven up to speed, and the shaft 2 and armature 3 are rotated up to full speed and then continue to turn with substantially uniform velocity. The final results to be obtained are the rotation of the propeller 10 to go ahead, to slow up, to stop, to start again, and to back at different speeds at will. To this end, assuming that the vessel is to be started, there is a load upon the propeller 10, and therefore when the controller 16 and the switch 18 are closed the field-magnet 4 will tend to remain stationary through the action of the load. Through the torque between the armature 3 and the field-magnet 4 the latter will begin to rotate in the same direction as that of the high-speed armature 3; but as there will still be a difference of speed between the armature 3 and the field-magnet 4 there will still be a generation of an electric current, but of lower and lower frequency the less the difference of speed. The current flowing will depend upon the voltage, the ratio of transformation, and upon the impedance of the motor-circuit. The motor will impart torque to the shaft 7, and since a current is flowing a torque of the same direction will occur between the field-magnet 4 and the armature 3 of the generator, the reversing-switch 18 having been set for motion in the same direction. If the load were too great to be overcome by the torque between the armature 3 and the field-magnet 4, it may now be overcome by moving the circuit-closer 16 over more of the contacts 17. Then the relative speed of the generator-armature 3 and its field-magnet 4, its voltage, the speed of the shaft 7, the counter electromotive force of the motor, and the torque upon the field-magnet 4 will quickly adjust themselves to drive the propeller 10, according to the capacity of the various elements and the work to be done by the propeller. The successive movements of the circuit-closer 16 over the contacts 17 will for the same load speed up the propeller. As the speed of the shaft 7 increases the relative speed of the armature 3 and the field-magnet 4 decreases, and hence the electromotive force drops; but the further moving of the controller 16 maintains the secondary voltage required by the motor.

I will now show mathematically an advantage to be gained by my complete system—namely, that at high speeds the losses of power transmission between the turbine 1 and propeller 10 are small. When the speed of the shaft 7 is, for example, one-third of the turbine speed, then one-third of the power is applied directly through the torque of the field-magnet 4 and two-thirds to generate a current for the motor. The more nearly the speed of the shaft 7 approaches the speed of the turbine the more nearly the total power is applied directly to the shaft 7. At any speed the work performed by the motor controls the total amount of work done. In turn the work of the motor is regulated by the controller 16. Consequently the controller 16 regulates the total work, and hence the speed of the vessel. These various assertions follow from the mathematical considerations below.

At any speed $$\frac{\text{Power delivered directly}}{\text{Total power}} = \frac{\text{Speed of the shaft 7}}{\text{Speed of turbine}}$$

that is, the work delivered to the motor decreases in proportion to the whole work of the turbine as the speed of the shaft 7 increases. Let L equal total power of turbine in horse-power. Let A equal speed of turbine in revolutions per minute. Let B equal speed of the shaft 7, revolutions per minute. Let T equal torque in pounds at one foot radius between armature and field-magnet of generator.

(1) Then $L = \dfrac{2 \pi T A}{33,000}$.

(2) $T = \dfrac{L \times 33,000}{2 \pi \times A}$.

(3) Horse-power at shaft $7 = \dfrac{2 \pi T B}{33,000}$.

Substituting the value of T in (2) in (3) I have (4) horse-power at the shaft 7 equals $\dfrac{L B}{A}$. The speed of the armature in the field will be $A - B$ and the horse-power applied to the generating current in the alternating-current generator $= 2 \pi T (A - B) = $ (from 2) $\dfrac{L (A - B)}{A}$.

As the relative speed of the armature and field-magnet of the generator falls the frequency of alternations also falls, and the motor must operate under lower frequency, as also must the transformer at 14.

The electromotive force at the motor may be varied independently of the controller 16 by a change in the exciting-current in the field-magnet of the generator.

In order that the vessel may back, the motor is reversed by throwing the switch 18 to the other poles of the reversing-switch, the turbine speed and direction of rotation being unchanged. The torque of the motor in the reverse direction, from the nature of the motor having large torque at starting, will overcome the torque between the generator elements on moving the controller 16 over the contacts 17. As the speed of the shaft 7 increases in the reverse direction the relative speed of the elements of the generator increases, the voltage increases, and the current in the motor-circuit can be kept up against the counter electromotive force and impedance, so that the motor gives torque in the reverse direction exceeding the torque of the generator in the "ahead" direction up to the limits of current and frequency that the motor will stand. The speed of the turbine may be decreased to keep down the frequency, or the maximum frequency at the full speed of the turbine may be kept below that at which the motor will successfully operate. It is evident that on reversing the motor it will transmit all the energy, and the economy will fall off in consequence. The importance of this will be judged by the conditions requiring reversal, which for most ships and a larger number of locomotives will be seldom; but with a reversing-turbine all the advantages had on the ahead direction are realized by reversing the turbine and operating as above described to go ahead.

Referring more particularly to Figs. 2 and 3, 20 represents two different car or locomotive axles, while the rotors of two turbines are indicated at 21, loose upon the shaft 22; but they are connected only to the external armatures 24. The shafts 22 are geared to the axles 20 and connected to the field-magnets 31. These rotors 21 carry external armatures 24, which are mounted, together with the rotors 21, upon the sleeve 25, surrounding the shaft 22 and forming a common hub in each case for the rotors and armatures. The rotors 21 have other hubs 26 around said shafts, and the armatures 24 have other hubs 27 around the shafts 22, which also have bearings 28 in the frame 29 and bearings 30 in oil for supporting the weights vertically.

The internal field-magnets 31 are fixed upon the shafts 22 for rotating therewith, and these field-magnets 31 and armatures 24 correspond to the similar parts 4 and 3 in Fig. 1, thereby acting as alternating-current generators.

32 represents the stators of the turbines.

The shafts 22 are geared by bevel-gearing 23, respectively, to the axles 20. The shafts 22 correspond to shaft 7 in Fig. 1.

The armatures 24 are connected to each other through gearing consisting of the pinions $24^A$ on the respective armatures and a spur-wheel $24^B$ on the frame 29, connecting the said pinions for distributing the power between the shafts 22 more evenly.

The motors 33 on various axles 34, to which they may be attached in any usual manner, correspond to the motor shown in Fig. 1 by the armature 11 and the field-magnet 12.

The locomotive is propelled in the following manner: The circuits for the locomotive if drawn would be the same as already shown in Fig. 1, as far as the regulating system is concerned. When the turbine-rotors 21, Fig. 2, are rotated by a fluid or gas under pressure, the armatures 24 are also rotated around the internal field-magnets 31, excited by current from the exciter 39. Electromotive forces are set up in the armatures 24, the circuits of which are closed through the primary coils of the transformers 35, the secondary circuits of said transformers being closed through the motors 33 by means of the controller 36, as shown in Fig. 3, with the result that a current flows in the closed circuit of the armatures 24 and a torque is produced between the armatures 24 and the field-magnets 31, tending to revolve the field-magnet 31, the shafts 22, and, through the gearing 23, the axles 20. The current flowing in the armature 24 in circuit with the primary coils of the transformer 35 induces a current in the secondary coils of said transformer in closed circuit, through the controller-arms, with the motors 33, producing a torque at the motor-axles 34. If increased torque is required, the controller-arm 36 is again moved to change the ratio of transformation, so that more current will flow through the motors 33, thereby increasing the torque of the motors at the axles 34, thereby also increasing the load on the turbines, and consequently increasing the torque at the axles 20. As the speed of the locomotive increases the relative speed of the generator armature and fields decreases, with the result that with constant field excitation the voltage and frequency of the current generated decrease, as does also the voltage at the terminals of the motors 33. To further increase the torque at the axles for the purpose of increasing the effort of the locomotive, the controller 36 is moved to increase the voltage in the secondary circuit of the transformer 35. In this manner the work performed by the motors is controlled, and hence the work of the prime movers is controlled, thus controlling the speed of the locomotive.

Fig. 3 shows in diagram the connections of one generator whose armature 24 is wound three-phase, with a transformer 35 connected in each phase, a motor 33 being connected to the secondary of each transformer. Each transformer has a controller 36 for regulating the voltage of the current to the motors. At 37 is a reversing-switch for each of the motors 33, operated by a common handle 38. The exciter for the generator-fields is represented by the armature 39 and field-magnet 40.

The device may be modified without departing from the spirit of the invention. For example, I do not limit my invention to the use of a multiple-contact transformer, as shown in diagram in Figs. 1 and 3, for varying the ratio of transformation, as there are other well-known methods of varying the relative electromotive force of the primary and secondary of the transformer—for example, the induction-regulator, in which the ratios of electromotive forces of primary and secondary are varied by changes in the reluctance of the magnetic circuit of the transformer. Again, the turbine is to be considered as representing any prime mover suitable as a substitute for the turbine.

I am aware that others have provided the combination of a source of electric current, a circuit supplied thereby extending along the line of travel, a vehicle, an electric motor carried by the vehicle, a starting-motor therefor, and a variable-speed device connecting the main motor and the running-gear of the vehicle. I remember in general that it is not new to provide electric motors with both elements revolving and to control them by braking or any other mechanical method.

No patents meet my case in which patents are shown a mechanical connection between the generator and the motor. By referring to what is old in a brief manner it will appear and be distinguished by explicit language what I consider novel, especially when taken in connection with the accompanying claims. I realize that there is known to be a method of transmitting power consisting in dividing the power derived from a given source into two always equal parts and conveying each of these two parts to perform independent work. I am acquainted with inventions in which it is proposed to rotate both members of either a generator or motor. Heretofore it has been suggested to provide an organization consisting of a power-shaft and a shaft to be driven, intermediate connecting mechanism comprising two independently-rotatable members, a closed winding on one of said members, a primary winding on the other of said members, a direct-current exciter for said primary winding driven by the power-shaft, and means for connecting one member to said power-shaft to the source of power and the other to the driven shaft. The prime mover drives a short-circuited generator.

Another uses a generator with one element driven, the other element being connected to the load; but he employs no auxiliary motor and wastes energy in resistances at certain stages. This apparatus will always reach in time a point where the speed of the vehicle is such that the voltage of the generator will be below the counter electromotive force of the motor.

My claims may be more easily interpreted also by my stating that I know of a system in which the inventor employs a direct current for driving the generator and proposes using the current generated in operating either a direct or alternating current motor; but he does not show how nor illustrate in just what kind of motor, the description being vague in this respect. At all events his system involves a main prime electric motor driving a generator, with the fields of both in series.

Another construction, distinguished from my invention, consists of a front and rear axle, two counter-shafts, one geared to each axle, a main shaft geared to the two counter-shafts, a field-magnet on each counter-shaft, a single circuit including the field-coils of both dynamos, a single circuit including the two armature-windings, and a variable resistance included in the armature-circuit. This has the same functions as my invention in so far as the prime mover operates one element of a two-part generator, the other element being connected to the load. A system of clutches is introduced whose functions are, however, only for indirect purposes. The clutches could probably be omitted, as they are only for reversing. With these omitted the case would more nearly meet my conceptions generically, except that it would be by means of a direct current in combination with resistances, and therefore it would have limits as explained in reference to a former device. As the speed of the vehicle increased and the relative speed of the armature and field of the generator decreased and the speed of the auxiliary motor increased the counter electric motive force of the motor would become so high that the generator would not feed current to it, so that no power would be transmitted, thereby limiting the economical speed.

By my invention, including an alternating current and a motor operating under variable frequency, I can, by controlling the ratio of transformation, keep up the electromotive force of the supply to the motor to a point where the relative speed of the armature and the field-magnet of the generator is so low that it is not far from zero within limits imposed by losses in the electric machinery and torque required to drive the vehicle. Therefore from a practical side of the question by properly winding the controlling-transformer I shall obtain sufficient electromotive force to put current through the motor so long as the relative speed of the generator elements is sufficient to generate electrical energy enough to make up the losses and to supply energy to the motor.

Heretofore there has been provided a changeable speed and torque device for power transmission to a driven part, having connection for receiving the available power and adapted to transmit it to the driven part at varying speed and torque, as desired, which consists of an element having two parts and both rotatable and capable of running at a speed difference and of developing a reactive effort between its parts, one of said parts being connected to the driven part, a power device connected to the other of said parts and capable of opposing the reactive effort developed between said parts, and means coöperating with said elements, whereby that factor of power not required at the driven part may be transformed into the required factor of the power and applied to the driven part. Therefore the prime mover drives one element of the generator, the other element being connected to the load, the generated current being fed to the motor, as in former cases referred to and as in my invention. There is a direct-current apparatus with or without battery. The control, however, is accomplished by a variation of the speed in the prime mover, ohmic resistances, and by switching, and the system has limitations of proportion of power transmitted by the motor at higher speeds. The use of a battery will somewhat widen these limits.

What I claim as my invention, and desire to secure by Letters Patent, is—

1. A motor-vehicle consisting of the combination of a prime mover, running at approximately constant speed, an alternating-current generator, one element of which is driven by said prime mover mechanically, a shaft to be driven, carrying the other element of said generator, an alternating-current motor whose one element is fixed to said shaft, and whose other element is stationary, and a transformer electrically connected between said generator and said motor, for varying the electromotive force supplied by said generator to said motor.

2. A motor-vehicle consisting of the combination of a constant-speed prime mover, a shaft therefor, an armature of an alternating-current generator, driven mechanically by said shaft, a shaft to be driven carrying the field-magnet of said generator, an exciter for said field-magnet, an alternating-current motor whose armature is carried by the last-named shaft, and whose field-magnet is stationary, which motor is adapted to operate under variable frequency, and means for controlling the ratio of transformation of current from said generator to said motor.

3. A motor-vehicle consisting of the combination of a prime mover, running at approximately constant speed, an alternating-current generator, one element of which is driven by said prime mover mechanically, a shaft to be driven, carrying the other element of said generator, an alternating-current motor whose one element is fixed to said shaft, and whose other element is stationary, a transformer electrically connected between said generator and said motor for varying the electromotive force supplied by said generator to said motor, and means for electrically reversing said motor.

4. A motor-vehicle consisting of the combination of a constant-speed prime mover, a shaft therefor, an armature of an alternating-current generator, driven mechanically by said shaft, a shaft to be driven carrying the field-magnet of said generator, an exciter for said field-magnet, an alternating-current motor whose armature is carried by the last-named shaft, and whose field-magnet is stationary, which motor is adapted to operate under variable frequency, and means for controlling the ratio of transformation of current from said generator to said motor, said means consisting of a multiple-contact electric transformer.

5. A motor-vehicle consisting of the combination of a turbine running at a uniform speed under all conditions of load, a shaft for the turbine, one element of an alternating-current generator, namely the armature, connected to and driven by said shaft, a driven shaft, independently rotary with respect to the other shaft and carrying the field-magnet of said generator, an armature of a single-phase series alternating-current motor mechanically directly connected to said driven shaft, said motor being capable of operating with variable speed and torque at different frequencies below a fixed maximum, a transformer whose primary coil is electrically connected to the armature of said generator, and whose secondary coil is electrically connected up with said motor, a controller for said transformer for throwing in and out of circuit at variable ratio of the number of turns of said primary and secondary coils for regulating the voltage of the current applied to the terminals of said motor, and a reversing-switch for changing the direction of motion of said driven shaft without changing the direction of rotation of the shaft of said prime mover.

6. A motor-vehicle consisting of the combination of turbines having rotors and stators, alternating-current generators whose armatures are mechanically connected to said rotors, shafts loose in said rotors and fixed to the field-magnets of said generators, axles for the wheels of said vehicle, gearing between said field-magnets and said axles, other gearing between said armatures, motors on the axles of said vehicle, transformers electrically connected up between said generators and said motors, and controllers for said transformers.

7. A motor-vehicle consisting of the combination of turbines having rotors and stators, alternating-current generators whose armatures are mechanically connected to said rotors, shafts loose in said rotors and fixed to the field-magnets of said generators, axles for the wheels of said vehicles, gearing between said field-magnets and said axles, other gearing between said armatures, motors on axles of said vehicle, transformers electrically connected up between said generators and said motors, controllers for said transformers, and reversing-switches for said motors, said generator being polyphase in each instance, with one of said motors in circuit with each armature-circuit of the generators.

8. In a motor-vehicle, the combination of axles, gearing thereon, alternating-current generators, turbine-rotors mechanically driving one element of each generator, the other element of each generator engaging with said gearing.

9. In a motor-vehicle, the combination of axles, gearing thereon, alternating-current generators, turbine-rotors mechanically driving one element of each generator, the other element of each generator engaging with said gearing, and electric motors on the said axles driven by the current from said generators.

10. In a motor-vehicle, the combination of axles, gearing thereon, alternating-current generators, turbine-rotors mechanically driving one element of each generator, the other element of each generator engaging with said gearing, electric motors on the said axles driven by the current from said generators, and a device for regulating the current of said generators.

11. In a motor-vehicle, the combination of axles, gearing thereon, alternating-current generators, turbine-rotors mechanically driving one element of each generator, the other element of each generator engaging with said gearing, electric motors on the said axles driven by the current from said generators, and a device for regulating the current of said generators, said device consisting of a transformer with its controller for regulating the electromotive force of the currents flowing from said generators to said motors.

In testimony whereof I have hereunto signed my name this 28th day of November, 1904.

HERBERT McNULTA. [L. S.]

Witnesses:
F. W. HARRISON,
GEO. P. WELLCOME.